Nov. 20, 1962

W. R. BAILEY ETAL 3,064,897

POSITION DETERMINING METHOD AND APPARATUS

Filed March 5, 1956

INVENTORS
WILBURN R. BAILEY AND
ROBERT G. HOCH

BY Stevens, Davis, Miller and Mosher

ATTORNEYS

United States Patent Office 3,064,897
Patented Nov. 20, 1962

3,064,897
POSITION DETERMINING METHOD AND APPARATUS
Wilburn R. Bailey and Robert G. Hoch, Dallas, Tex., assignors to Texas Instruments Incorporated, Dallas, Tex., a corporation of Delaware
Filed Mar. 5, 1956, Ser. No. 569,570
12 Claims. (Cl. 235—190)

This invention relates to a passive system for determining the position of radiant energy producing objects. More particularly, this invention relates to a passive system for determining the bearing, distance and elevation of infrared radiation producing objects such as, for example, aircraft, ships, vehicles, and missiles. As used herein, the word "passive" denotes a system which detects radiant energy transmitted from or emitted by an external source.

For many purposes, it is essential to be able to detect the presence of aircraft, ships, vehicles, or other objects. Thus, in navigating a craft on land, at sea or in the air, the navigator needs to be able to observe his position relative to other objects at all times. In times of warfare, pilots, ship at sea and ground crews must be able to detect the approach of other aircraft, ships, vehicles and the various types of missiles. Under certain conditions, visible light waves may be employed for observation and detection purposes but in case of dense fog, adverse atmospheric conditions, or the lack of radiated or reflected visible light waves, such waves are not available for these purposes. Infrared waves overcome the limitations of visible light waves in at least two ways. First, infrared waves at certain frequencies are able to penetrate fog and, as a consequence, provide detectable information under adverse weather conditions. And second, infrared waves are produced by heated objects such as aircraft engines and the smoke-stacks of ships and thus infrared radiation is available even though there may be no visible light waves.

In the prior art, systems utilizing radiant energy in the form of infrared waves are known for measuring distance, bearing, and elevation. One such system has used infrared waves to measure distance in the form of elevation of an aircraft above the ground. In the system, a light source, a major portion of whose spectral energy is within the infrared range, is fixed at one portion of the aircraft to send a slender directive beam of spectral energy to the ground. Located along a line constituting the base of a triangle, and at a known distance from the highly directive light beam is a rotating angle measuring device. Since the angle of the beam of infrared light is fixed with respect to the base line and the length of the base line is known, the elevation of the aircraft above the ground is then a direct trigonometric function of the infrared wave reflection angle measured by the rotating angle measuring device. In another system for indicating bearing, for instance the bearing of a ship, a pair of thermo-couples is located at the focus of a reflector. The image of the source of infrared radiation formed at the focus is of sufficient size to fall on and energize the two thermo-couples to an equal extent when the reflector is pointed directly at the source. However, when the reflector direction deviates slightly from the correct bearing, one or the other of the thermocouples will no longer be covered by the image and the indicating means informs the navigator which of the thermo-couples is no longer energized and enables him to correct his course accordingly. When installed in an aircraft, the system provides an additional pair of thermo-couples, one pair indicating deviations from the correct bearing and the other pair indicating deviations from the correct elevation of the source. The disadvantage of the first mentioned system is, of course, that it is capable of measuring only the elevation of the aircraft above the ground and cannot be used to measure the distance to other infrared emitting objects. In the latter mentioned system, the arrangement is capable of indicating only deviations in bearing or elevation from a source of radiant energy and cannot be used to measure either the distance to the source or the elevation, bearing and distance of other infrared emitting objects.

In the present invention, a passive system is provided for determining the bearing, distance and elevation of radiant energy producing objects by detecting radiations emitted therefrom. Although the system finds its most particular use in detecting infrared radiations, it is not to be considered as limited thereto since wavelengths in the visible light and shorter wavelength regions may be utilized within the teachings of this invention. In the detection of radiations, two detectors are used each comprising an optical system for focusing radiant energy upon a photo-resistive or a photo-voltaic semiconductor. The detectors are gimbal mounted to permit constant speed rotation about their vertical axes as well as angular movement about their horizontal axes. The detectors are spaced apart from each other to establish a base line and positioned therebetween is a reference source of radiant energy.

Whenever radiant energy is detected during the scanning operation, the detectors individually produce pulses which initiate constant frequency pulse counting operations. The pulse counting operations continue from the point of detection until the detectors have rotated to the base line and their optical systems directly face the reference source. Then, a coded pulse from the source, through appropriate circuitry, stops the pulse counting operations. The number of pulses counted in each separate operation is a direct measure of the time of rotation and, thus, the number of pulses is representative of the angle at the detector between the line of detection and the base line. Knowing the length of the base line and the two included angles, the remaining angle of the triangle defined is determined as a voltage in a polar coordinate type computer. The voltage of the angle, known herein as the parallactic angle, represents the diameter of a circle which passes through a source of infrared radiation and one of the detectors. A selsyn at the detector measures the cosine of the angle between a line perpendicular to the base line at the detector and the line of radiation from the infrared source in terms of voltage. Then by combining the diameter of the circle voltage and the cosine of the angle voltage, a voltage is produced which measures the distance to the source. The cosine of the angle voltage and the distance voltage may be applied to a suitable bearing angle and distance readout device.

In addition to the cosine of the angle selsyn, another selsyn is mounted on the detector chosen for the distance computation. This selsyn is aligned with the horizontal tilt axis and produces a sine wave voltage corresponding to the cyclical tilt of the detector which voltage is applied to the vertical deflecting plates of a cathode ray tube. The cosine of the angle selsyn, mounted on the detector vertical spin axis, feeds its output voltage to the horizontal deflecting plates of the cathode ray tube in a path separate from the computer. The same pulse which initiates the pulse counting operation is fed to the cathode ray tube to intensity modulate the cathode and thereby produce a spot on the screen indicative of the elevation angle and the bearing angle. The bearing angle is repeated as an aid in correlating the elevation, bearing and distance information concerning a radiating object.

Accordingly, it is an object of this invention to provide a passive position determining system suitable for military as well as non-military use.

It is another object of this invention to provide a passive system for determining the bearing, distance and elevation of radiant energy producing objects.

It is a further object of this invention to provide a passive system for determining the bearing, distance and elevation of infrared producing objects.

It is a further object of this invention to detect infrared radiations at each of at least two constant speed rotating detectors.

It is another object of this invention to measure the angle between two separated radially extending lines as a function of the time required for a constant speed detector to rotate from one line to the other.

It is a further object of this invention to measure angles as a function of time by counting the number of constant frequency pulses generated over a period equal to the time function of said angle.

It is a still further object of this invention to provide the distance of an infrared radiating object by a computation technique which includes determining the parallactic angle.

It is a still further object of this invention to compute the distance of an infrared radiating object by techniques involving the polar coordinates of a circle.

The above objects will be clarified and other objects made known from the following discussion when taken in conjunction with the drawings in which.

Figures 1, 4:
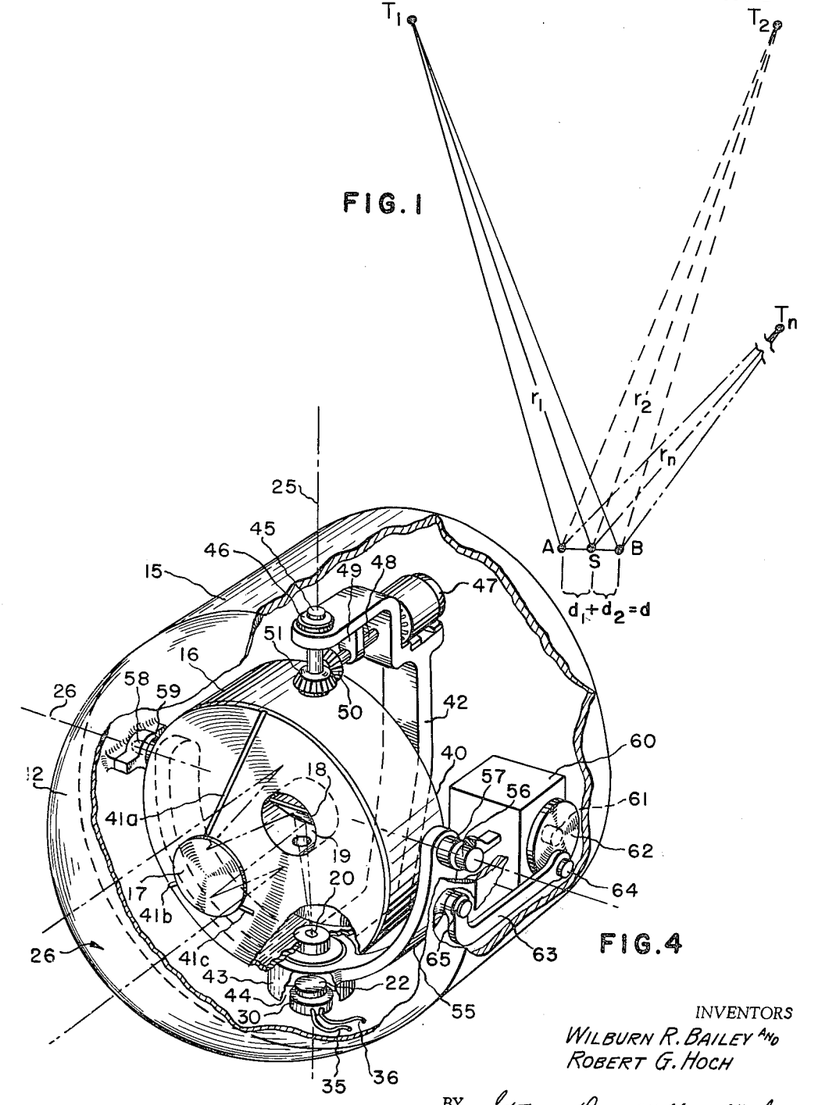
FIGURE 1 is a partial schematic illustrating a preferred arrangement for the components used in determining the position of infrared radiating objects.
FIGURE 4 is a view in perspective of a gimbal mounted detector suitable for use in aircraft.

Referring now to the drawings, FIGURE 1 represents a partial schematic of the component arrangement used in the present invention to determine the bearing and distance of infrared producing objects. In FIGURE 1, the detectors A and B are separated at a distance from each other, the letter $d$ designating a straight line and the distance between A and B. A reference source of radiant energy S is positioned on the line $d$ intermediate A and B. Preferably, source S is positioned at the midpoint between A and B thus dividing the line $d$ into the equal segments $d_1$ and $d_2$. Detector A is mounted in a gimbal arrangement which permits the optical system to scan in elevation as it is being rotated in a clockwise direction. Detector B is mounted in like manner to detector A and also rotates in a clockwise direction. As the detectors rotate, infrared waves from sources $T_1$, $T_2$ ... $T_n$ are received and angles are measured from the line of detection to the base line $d$. Thus, detector A measures angles $T_1AB$, $T_2AB$ ... $T_nAB$ and detector B measures angle $T_1BA$, $T_2BA$ ... $T_nBA$.

Figure 2:
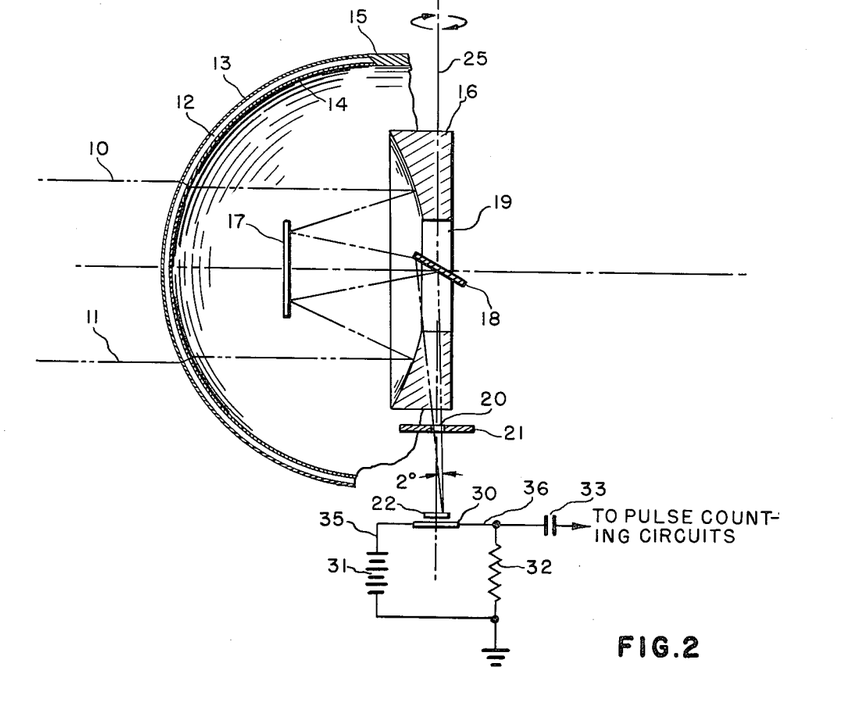
FIGURE 2 is a schematic representation of the radiation focusing optical system, the photo-conductive cell and the A.-C. voltage circuit comprising the detector of this invention.

The detector optical and electrical system which initiates the angle measurement operation of this invention is shown schematically in FIGURE 2. In FIGURE 2, the infrared radiating from some source, for example $T_1$, first fall upon the optical window 12. Optical window 12 is a silicon crystal formed in the shape of a hemisphere and may be of a size up to six inches in diameter and have a thickness of 0.2 inch. Window 12 is bonded to a closure member 15, only a fragment of which is shown. Silicon provides an ideal window for infrared radiations since it is opaque to ultra-violet, visible light and very near infrared waves up to 1.2 microns in length and is essentially transparent to the longer wavelengths of infrared. However, should it be desired to detect radiant energy in the very near infrared, visible or ultra-violet wavelength regions, some optical window such as glass can be substituted for the silicon window 12. Silicon transmits approximately 53% to 55% of the radiation wavelengths between 1.2 microns and 7 microns, the amount transmitted depending upon the wavelength of the incident radiations and the temperature of the silicon. In order to maximize the transmission characteristics of silicon over the wavelengths of interest, anti-reflection coatings 13 and 14 are coated on the silicon window 12. Such coatings may be of arsenic trisulfide or titanium dioxide and, when coated on the silicon in thicknesses of ¼ wavelength or multiplies of a ¼ wavelength at the desired frequency, a transmission efficiency of 90% or greater may be achieved for wavelengths over a 2 micron band and of about 80% for wavelengths over a 4 micron band.

The rays 10 and 11 are transmitted in a refracted path through window 12 and are collected by spherical mirror 16. From the spherical mirror, the rays are reflected first to plane mirror 17 and thence to plane mirror 18. Plane mirror 18 is mounted in the open center section 19 of spherical mirror 16. The angle at which mirror 18 is mounted is such that infrared waves are focused through an aperture 20 upon a recticle 22 so as to be slightly off center from the vertical spin axis 25 of the detector. Aperture 20 is formed in blank 21 with a diameter of 0.25 inch thus limiting the radiations received to those falling within a beam width angle of 2°.

Figure 3:
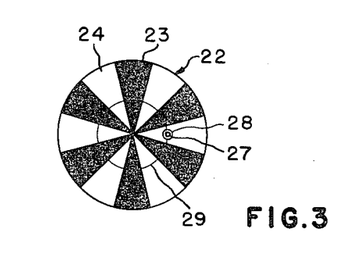
FIGURE 3 is an enlarged view of the radiation chopping system used in conjunction with the photoconductive device and A.-C. voltage circuit of FIGURE 2.

The reticle 22, in order to be transparent to infrared radiations, is a silicon disc and constitutes a radiation chopping or modulating device. As shown in FIGURE 3, reticle 22 is coated in such a manner as to produce opaque areas 23 alternating with radiation transparent areas 24. Although the opaque areas are shown as being wedge-shaped, the areas 23 may take any shape or form which will modulate the radiations transmitted through the reticle. As has been mentioned above, the radiations focused upon reticle 22 by mirror 18 are off center from the vertical axis of rotation 25. The radiations are focused primarily on the point indicated by dot 27 but, due to the phenomenon of spherical aberration resulting from mirror 16, the radiations spread out over an area indicated by 28. When the optical components are rotated relatively to reticle 22 about the axis 25, the incident radiations follow a path described by the circle 29. It can thus be seen that the radiations fall on alternate transparent and opaque areas.

The radiations transmitted through the reticle 22 fall on the photo-sensitive semiconductor or detector cell 30. Photo-sensitive semiconductors, which may be either photo-voltaic or photo-resistive in type, have the property that, in the presence of darkness, they become virtual insulators but, in the presence of light, they become moderate conductors. Photo-voltaic semiconductors, typified by indium antimonide photocells, contain a p-n junction and, upon the incidence of radiations, a potential difference is created across the p-n junction. Photo-resistive devices, comprised for example of lead telluride, exhibit the property of decreased resistance in the presence of radiations. As used herein, the detector cell 30 exhibits the properties of a photo-resistive semiconductor and is biased by battery 31. Connected in series with semiconductor 30 is a resistor 32. The modulated radiations from reticle 22 incident upon semiconductor 30 alternately increase and decrease its resistance and thus an A.-C. voltage is developed across resistor 32. This A.-C. output voltage is fed through the D.-C. blocking condenser 33 to a pulse counting circuit which is described hereinafter in connection with FIGURE 5. Leads 35 and 36 serve, respectively, to feed the bias voltage to and the output voltage from cell 30.

A detector, constructed in accordance with the principles described in FIGURE 2, may be installed in an aircraft, on ships, vehicles, or in a stationary ground installation as an integral component of a system for determining the position of radiation emitting objects. For a detector embodiment suitable for installation in aircraft, reference is now made to the perspective view of FIGURE 4. Similar components in FIGURES 2, 3, and 4 carry like numbers.

A dished cylindrical member 40 encloses spherical mirror 16. Depending from member 40 are struts 41a, 41b, and 41c serving to support mirror 17. Aperture 20 is formed in the underside of member 40 in line with the vertical axis of rotation 25. Concentric about vertical axis 25, the inner race of ball bearing 43 is fixed to the underside of member 40 while the outer race of the bearing is secured to a leg of the U-shaped vertical yoke 42. Bearing 43 is constructed so as to provide an internal cavity area 44. Cavity area 44 contains reticle 22 and detector cell 30 and permits them to remain in a fixed but stationary position relative to the optical components. In line with the vertical axis, rod 45 is fixed to the upper side of member 40. Rod 45 is secured to the inner race of ball bearing 46 and the outer race of ball bearing 46 is secured to the upper leg of yoke 42. The upper end of yoke 42 supports the detector spin motor 47. The output shaft 48 of motor 47 is supported by a bushing 49 depending from the upper leg of yoke 42 and a bevel gear 50 is keyed to the end of output shaft 48. Bevel gear 50 engages a matching bevel gear 51 keyed to rod 45.

The vertical yoke and optical component assembly is affixed to and supported at the center line of the horizontal axis yoke 55. The outer races of ball bearings 57 and 59 are secured to the vertically extending legs of the U-shaped horizontal yoke 55. Shafts 56 and 58 are secured to the inner races of ball bearings 57 and 59, respectively, and the shafts 56 and 58 are affixed to the enclosing cylinder 15 at the horizontal tilt axis 26. The optical window 12 provides the closure for cylinder 15. Suitable means for tilting the assembly about the horizontal tilt axis 26 is provided by a servo-motor drive 60 fixed to the cylinder 15. A disc 62 is keyed to the output shaft 61 of servo-drive 60 and eccentrically connected thereto is a connecting rod 63. Connections 64 and 65 rotatably connect rod 63 to the disc 62 and the horizontal yoke 55, respectively.

From FIGURE 4, it can be seen that the optical components are free to spin about vertical axis 25 while reticle 22 and detector cell 30 are allowed to remain stationary but in fixed alignment with the optical components. The elevation scanning feature of the optical system is provided by the horizontal yoke and servo-driven eccentric which tilts the optical components about the horizontal axis 26. The preferred motor speeds for the detector of this invention provide a spin rate of the optical components about vertical axis 25 of 600 r.p.m. and a cyclical scan rate about horizontal axis 26 of 30 cycles per minute. The embodiment of FIGURE 4 is very advantageous for airborne installations because of the small wind resistance and drag created by the detector. However, the limited scan thus provided by the stationary window 12 may be undesirable for ground and ship board installations. Therefore, for ground and ship board installations, the optical window and cylinder could be made to rotate as an integral unit with the optical components and the gimbal mounting arrangement would then be externally connected to the cylinder 15.

Figure 5:
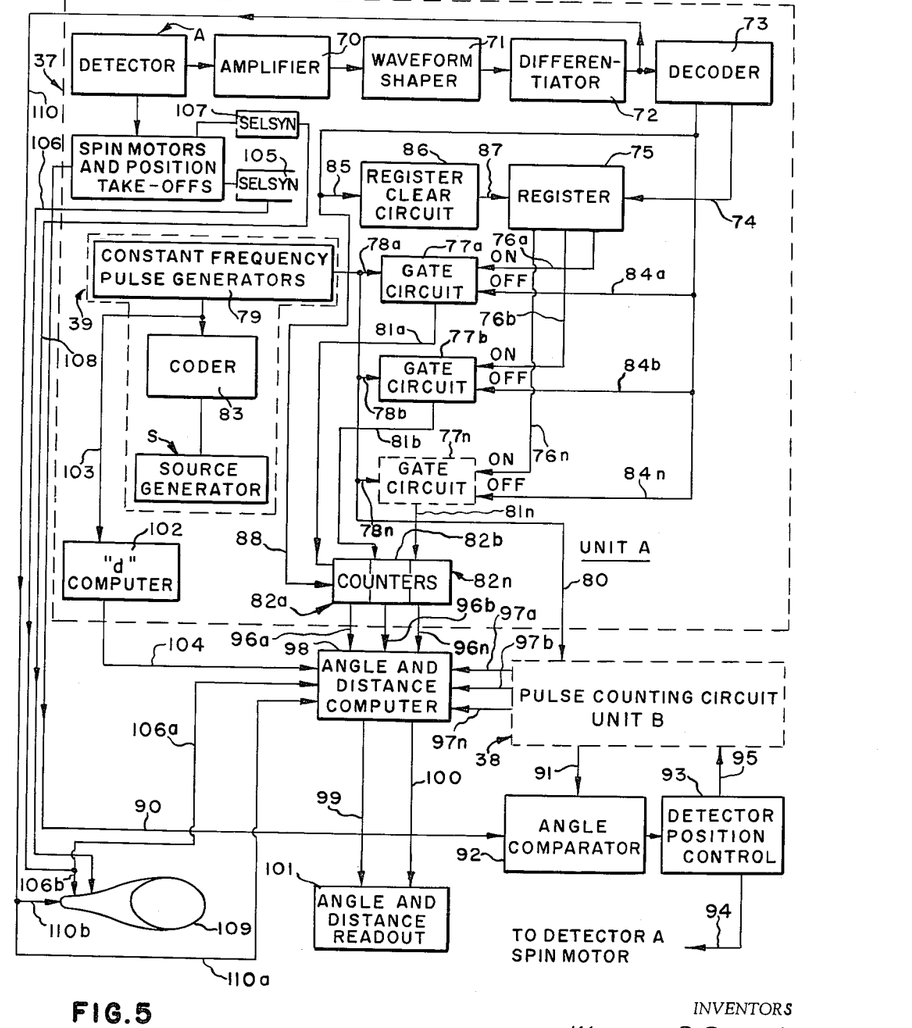
FIGURE 5 is a block diagram of the circuit components required in conjunction with the detector of FIGURE 2 to compute and indicate the distance, bearing and elevation of infrared radiating objects.

Referring now to FIGURE 5, a block diagram is shown of the circuitry required in conjunction with the detectors of FIGURE 2 to compute and derive the distance, bearing and elevation of an infrared emitting object. The description of FIGURE 5 is primarily in terms of only the detector A since the pulse counting circuits for both detectors A and B, for the most part, are identical. Further, the circuits and components involved in determining the space coordinates of an object are well-known in the computer and radar arts and it is, therefore, deemed unnecessary for the purposes of this invention to show the circuits and components in detail.

The modulated A.-C. output voltage, produced by detector A upon receiving infrared radiations from source $T_1$, is fed to the pulse counting circuit 37 shown enclosed by dotted lines. The A.-C. signals are first amplified in an amplifier 70 and, after amplification, are fed to a waveform shaper 71. Waveform shaper 71 may be either a conventional squaring amplifier or a diode limiting circuit. After being shaped to a rectangular waveform, the waves are fed to a differentiator 72 where a conventional resistance-capacitance differentiating network produces sharp positive and negative pulses denoting the leading and trailing edges, respectively, of the rectangular wave. In the decoder 73, a diode circuit bypasses the negative pulses to a ground return and passes the positive pulse through lead 74 to the input of register circuit 75.

Register circuit 75 consists of a number of flip-flop stages connected in cascade, the number of stages being equal to the number of infrared sources to be accepted during any one horizontal scan of the detector. Initially, prior to the reception of a signal pulse, the input side of each flip-flop is in a non-conducting state. The first positive pulse from the differentiator circuit 72 causes the input of the first flip-flop stage to change from a non-conducting state to a conducting state and the second half of the first stage then becomes non-conducting. For a discussion of flip-flop circuits, see section 13.7, volume 1, Radiation Laboratory Series. On changing from a conducting to a non-conducting state, the second half of the first stage flip-flop generates a positive pulse in its plate circuit as the plate current ceases. This positive pulse is applied through lead 76a to gate circuit 77a which may also be a flip-flop circuit. The input side of gate circuit 77a is normally conducting and the positive pulse flips the circuit to cause the second half to become conductive. The second half of gate circuit 77a is then in condition to receive pulses from the constant frequency pulse generator 79 through lead 78a and permits these pulses to feed through lead 81a to the counter circuit 82a. Counter circuits 82 consist of a series of conventional binary scalers connected in cascade.

As detector A continues its horizontal scan, radiations may be detected from a second source $T_2$. In the manner described above, the radiations from $T_2$ result in a positive pulse being fed to register 75. Due to the first positive pulse, the input half of the first flip-flop stage was changed to a conducting state and the second half changed to a non-conducting state. The second pulse received causes the conducting states to reverse thus making the first half non-conducting and the second half conducting. The positive pulse from the plate circuit of the input half of the first stage flip-flop is fed to the input half of the second stage flip-flop. The input half of the second stage flip-flop then becomes conductive and the second half non-conductive. The positive pulse caused by the cessation of plate current is fed through lead 76b to the input side of gate circuit 77b. Upon receiving this pulse, gate circuit 77b flips thereby making its second half conductive. Constant frequency pulses from pulse generator 79 are then received through lead 78b and fed through lead 81b to the counter circuit 82b. For an infrared source $T_n$, the process is entirely similar and results in a pulse from the nth stage flip-flop in register 75 through lead 76n to gate circuit 77n. Gate circuit 77n becomes conductive and passes constant frequency pulses through leads 78n and 81n to counter circuit 82n.

Constant frequency pulse generator 79 constitutes part of the circuit 39, the circuit portion of the position determining system which is common to both pulse counting circuits 37 and 38. In this invention, pulses are produced by generator 79 at a frequency rate of 12.96 megacycles per second. When compared with a rotational speed for the detectors of 600 r.p.m., this frequency corresponds to one pulse for each second of angle scanned by the detectors. However, this pulse frequency generation constitutes no limiting factor on this invention since the pulses may be generated at any desired frequency. The constant frequency pulse path to the pulse counting circuit 38 for detector B is by means of lead 80.

All angles to radiation emitting objects $T_1, T_2 \ldots T_n$ are measured with respect to line $d$ between the detectors A and B. Therefore, as detector A rotates to a position whereby radiations are received along line $d$, gate circuits 77 must be closed to stop the flow of constant frequency pulses to the counter circuits 82. This is accomplished by first receiving at detector A a signal from the reference infrared source S located on line $d$. In order to eliminate ambiguity as to whether a received signal is from a radiating object $T_1 \ldots T_n$ or from source S, the reference source signal is provided in coded form through a coder 83. Although a number of coding techniques may be used including pulse width and pulse position modulation, the preferred technique is to provide an interlock with the detector scan position. In this technique, the reference source radiates energy only during a narrow azimuth range. The circuit whereby this is accomplished consists of a commutator fixed to the vertical axis of the detector scan system in such a manner that the source is permitted to radiate only when the detector scan position is in the region of, for example, 5° to either side of the line $d$.

Coder 83 modulates pulses from pulse generator 79 so that the output of source generator S is limited to a series of infrared radiataion pulses having a fixed duration and fixed repetition rate. The pulses from source S are processed by the detector and the amplifier, waveform shaper and differentiator circuits in the same manner as described for radiations from $T_1 \ldots T_n$. Instead of passing directly to the gate circuits 77, however, the pulse code group is passed to the decoder 73 through a gate which is energized only when the commutator is in the closed position. Decoder 73 consists primarily of a delay circuit and a coincidence circuit. The delay time is equal to the spacing between pulses. The first pulse of the series is delayed for one period and is applied in synchronism with the second pulse to the coincidence circuit. When coincidence occurs, a pulse is put out by the coincidence circuit. This output pulse is applied to gates 77a, 77b . . . 77n through leads 84a, 84b . . . 84n respectively, which flips the circuits so that the input sides are once more conductive and the second halves are non-conductive. At the instant of closing gates 77, the number of constant frequency pulses passed through the gates to the counter circuits 82 represents a direct measure of the angle between the line $d$ and the line of radiation from each of the sources $T_1 \ldots T_n$.

Simultaneously with the pulse to gates 77, the pulse from decoder 73 is fed through lead 85 to register clear circuit 86 and through lead 88 to the counter circuits 82. The pulse to register clear circuit 86 triggers a series of pulses which are fed through lead 87 to register 75. These series of pulses reset the flip-flop circuits to that the first half of all stages are in the non-conducting state and the second halves are in the conducting state. The pulse applied through lead 88 to counter circuits 82 advances the number of pulses accumulated in each counter to its section of the angle and distance computer 98 through leads 96a, 96b . . . 96n.

Pulse counting circuit 38 for detector B is identical to the pulse counting circuit 37 described for detector A. However, because detectors A and B rotate in the same direction and detector B will thus be displaced 180° when detector A is facing source S, the counter circuits of circuit 38 operate conversely to those of circuit 37 in order to permit angles to be read directly. To describe this operation, the counters in circuit 38 equivalent to the counters 82 in circuit 37 are preset with a number of pulses representative of an angle of 360° and are connected in the reverse direction to counters 82 so that pulses are subtracted from the number preset into the counters. Thus, whenever pulses indicating the presence of infrared sources $T_1, T_2 \ldots T_n$ are received, gates 1 . . . $n$ in circuit 38 are opened and constant frequency pulses from pulse generator 79 will be fed through the gates to the counter circuits. The pulse counting (subtracting) continues in all circuits until detector B faces source S and then a coded pulse from S is fed to the gate circuits to stop the pulse counting (subtracting) operation. The same pulse from S is also fed to the counters and serves not only to advance the number of pulses remaining in each counter to computer 98, which pulses directly measure the angles to $T_1, T_2 \ldots T_n$, but also to preset the counters with the number of pulses representative of 360°.

To insure that the angles at detectors A and B are being measured to line $d$ as the common reference line, the pulse counting operations in circuits 37 and 38 must be stopped exactly one half revolution apart. This is accomplished by mounting 360° potentiometers to the vertical axes of detectors A and B. The voltage across each potentiometer at the zero commutator position is fed from detector A by lead 90 and from detector B by lead 91 to angle comparator 92. The voltage from detector A is delayed for a time equal to one half revolution by means in angle comparator 92 so that the voltages may be compared simultaneously. There the voltages are compared and, if a difference voltage exists, this voltage is fed to detector position control 93. The difference voltage is amplified and fed as a negative feedback voltage through lead 94 to the spin motor for detector A or through lead 95 to the spin motor for detector B. The negative feedback voltage serves either to increase or decreae the spin rate of the detectors and maintain their rotation at a constant 600 r.p.m.

Figure 6:
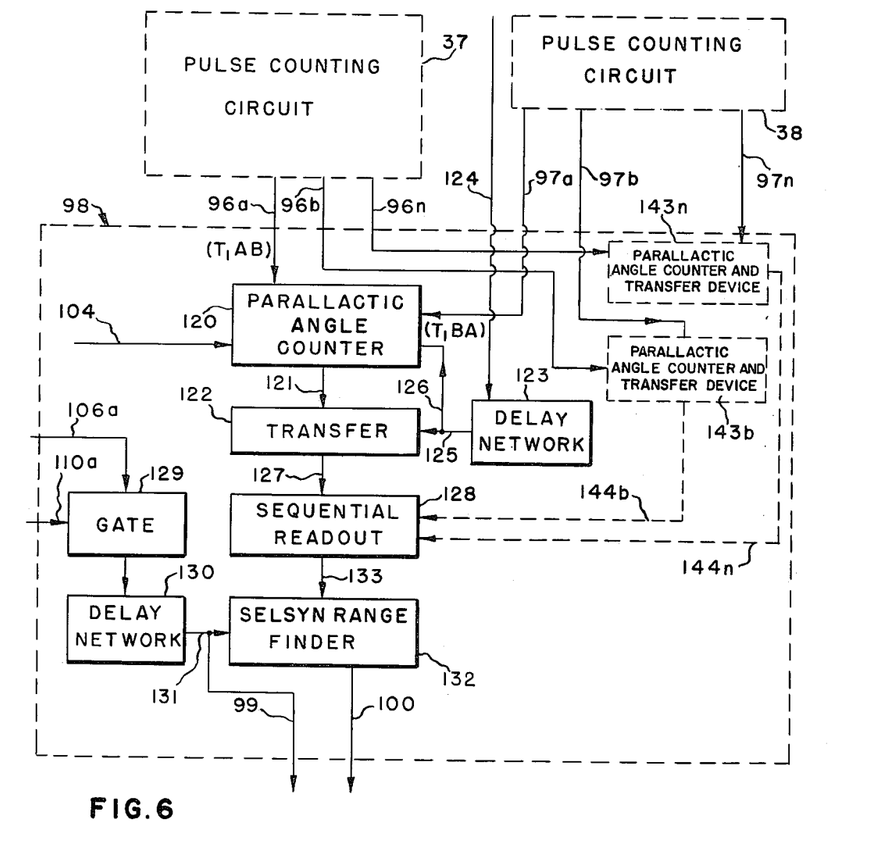
FIGURE 6 is a block diagram of the circuit components comprising the polar coordinate type computer in the preferred embodiment of this invention.
Figure 7:
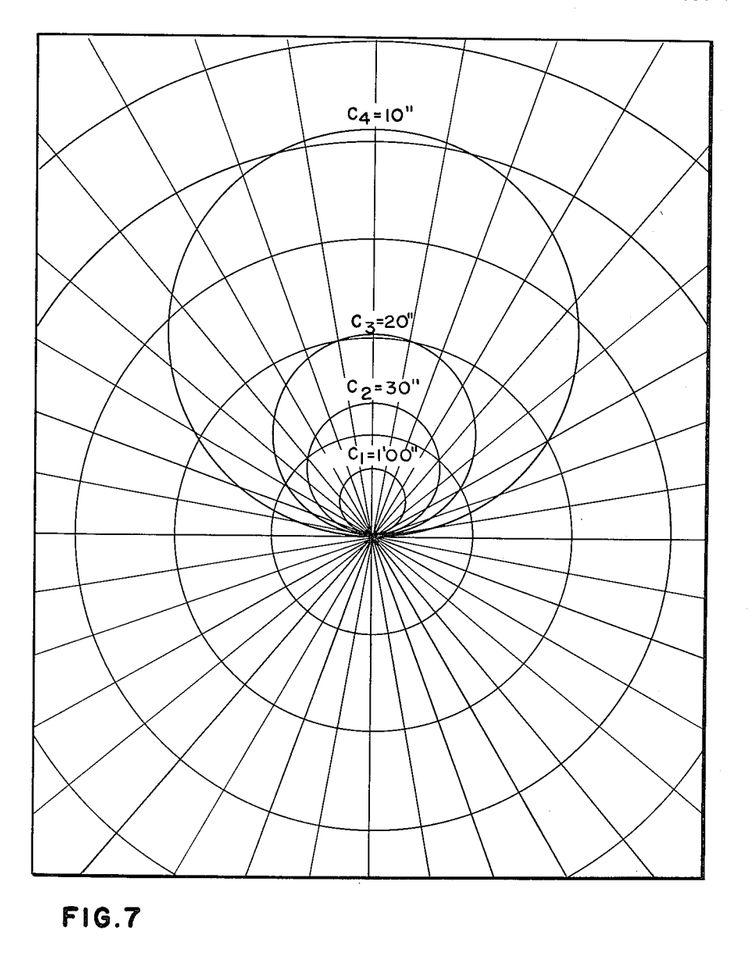
FIGURE 7 is a polar coordinate plot of a family of circles for various values of constant parallactic angle and illustrates that the diameters of the circles are determined by and are inversely proportional to the size of the parallactic angles.

Reference is now made to the block diagram of FIGURE 6, which in conjunction with FIGURE 5, illustrates the components comprising computer 98. The principal purpose of computer 98 is to compute the distance to an infrared source and, for this purpose, is provided with polar coordinate functions. To explain, from the equation of a circle in terms of polar coordinates, it can be shown that for a constant parallactic angle, the distance to an infrared source will be on a circle having a diameter equal to the distance of the source if it were on a line of bearing 90° from the line between the detectors. Parallax may be defined as the difference in apparent direction of an object as seen from two different points and, as used herein, the parallactic angle is used to mean the angles at $T_1 \ldots T_n$. To illustrate that a constant parallactic angle defines a circle, FIGURE 7 shows a family of circles for various values of constant parallactic angles. The family of circles is drawn through an origin, described hereinafter as detector A, and it can be seen that the diameters of the circles vary inversely with the size of the parallactic angles. Thus, the diameter of the circle defined by the parallactic angle $C_1$ equal to 1′ 00″ is much smaller than the diameter of the circle defined, for example, by the parallactic angle $C_4$ equal to 10″. Taking detector A as the point of origin, the equation of these circles in terms of polar coordinates is given by:

$$R = D \cosine (T_1 AB \ldots T_n AB - 90°)$$

where $R$ = distance in feet at angle $T_1AB \ldots T_nAB$,
$D$ = the diameter of the circle in feet, and $T_1AB \ldots T_nAB$ = the angle from a line of infrared radiation to the line between detectors A and B.

The functions of the above equation are provided by computer 98 in the following manner. The counted pulses from the counter 82a of circuit 37 are received at parallactic angle counter 120 through lead 96a and the pulses from the like counter in circuit 38 through lead 97a. Counter 120 is a binary subtractor preset with a number of pulses equivalent to an angle of 180°. Since detector A leads detector B by a one-half revolution, the number of pulses representing angle $T_1AB$ are received first by counter 120 and subtracted and then the number of pulses representing angle $T_1BA$ are subtracted. The remaining number of pulses represents the parallactic angle at $T_1$ which pulses are fed through lead 121 to transfer device 122. The coded pulse from source S, which stops the pulse counting (subtracting) operation in circuit 38 and advances the pulses to computer 98, is fed through lead 124 to delay network 123. After a delay in network 123 sufficient to permit the pulses representing $T_1BA$ to be subtracted in counter 120, the pulse is fed through lead 125 to transfer device 122 and through lead 126 to counter 120. This pulse presets counter 120 to a number of pulses equal to 180°. However, in transfer device 122, the pulse initiates a voltage summing operation which consists of adding the voltage from each pulse comprising the parallactic angle. The voltage achieved by the transfer device 123 at the instant of counting the final pulse is equivalent to D, the diameter of the circle for the particular parallactic angle. The D voltage is then discharged through lead 127 to sequential readout 128.

It should be recognized that, in order to determine the parallactic angle in a computational method based on polar coordinates, it is necessary to know the distance $d$ between detectors A and B. When the base length distances $d_1$ and $d_2$ are rigidly fixed, as in some airborne installations and in ground installations, the measurement of $d_1$ and $d_2$ may be made once and set into computer 98 as a constant value. However, when it is necessary to measure the $d$ distance, any one of several methods may be used but the following is preferred from the standpoint of accuracy. A miniature radio frequency transmitter is located at reference source S. A transmitter generates a continuous wave signal on a convenient radio frequency and feeds this signal to an antenna. A small tuned reflector mounted at detector A (not shown) reflects the radiated waves back to the transmitting antenna where a beat frequency is produced between the transmitted and received waves. This beat frequency is passed by an RF choke to the "d" computer 102, shown in the block diagram of FIGURE 5. The frequency of the beat note is proportional to the distance from S to the reflecting antenna and thus to the distance $d_1$. This beat note frequency is used to control the number of constant frequency pulses fed from generator 79 to computer 102 through lead 103 and from the computer 102 to computer 98 through lead 104. A similar arrangement is required to obtain the distance $d_2$ between source S and detector B. The $d$ distance computation correction may be achieved in counter 120 by, for example, adding pulses to the number of pulses representative of 180° should the $d$ distance exceed a fixed distance and by subtracting pulses should the $d$ distance decrease below the fixed $d$ distance. Since the parallactic angle is represented by a number of pulses, this manner of correcting for variation in the $d$ distance will be reflected directly in the parallactic angle.

To provide a voltage equivalent to $\cos(T_1AB - 90°)$ in the computational formula, a selsyn 105 (see FIGURE 5) is connected to the vertical spin axis of detector A. The output voltage of selsyn 105 is a sine wave voltage whose instantaneous amplitude is equal to the cosine of the desired angle. The output from selsyn 105 is fed through leads 106 and 106a to gate 129 in the computer 98. As has been described above, whenever an infrared source is detected, detector A produces a modulated A.-C. voltage which is amplified, shaped and differentiated in circuit 72 to produce a positive pulse. This positive pulse from the differentiator circuit 72 is fed through leads 110 and 110a to the gate 129 to open the gate momentarily. During the momentary opening, a voltage equal to $\cos(T_1AB - 90°)$ is permitted to pass. This voltage is delayed for a period equal to one revolution of detector A in the delay network 130 and then fed through lead 131 to selsyn range finder 132.

The voltage in sequential readout 128, equivalent to the diameter of the circle for the parallactic angle at $T_1$, is fed through lead 133 to the selsyn range finder 132. Selsyn range finder 132 consists of a selsyn revolving in synchronism with the scan head. The D voltage is applied to the selsyn and, when the angle voltage, cosine $(T_1AB - 90°)$ from lead 131 is applied to the selsyn, the output voltage obtained from the selsyn is then D $\cos(T_1AB - 90°)$, which is very substantially the R voltage for the distance $r_1$ to the infrared radiating source $T_1$ as indicated in FIGURE 1. The distance voltage R is then applied to the analog angle and distance readout 101 through lead 100 and, simultaneously therewith, lead 99 connected to lead 131 between delay network 130 and range finder 132, feeds the angle voltage to readout 101. Readout 101 may be a cathode ray tube with X—Y coordinates of bearing angle and distance or some other positioning apparatus sensitive to voltages.

To permit successive computation of R voltages, representing distances $r_2 \ldots r_n$ to infrared sources $T_2 \ldots T_n$, parallactic angle counters and transfer devices 143b ... 143n are provided. Circuit 143b receives pulses through leads 96b and 97b and circuit 143n receives pulses through leads 96n and 97n. Circuits 143b and 143n provide D voltages which are then fed through leads 144b and 144n to the sequential readout 128. Sequential readout 128 applies the D voltages sequentially to the selsyn range finder 132 where the R distance voltage to each infrared source $T_2 \ldots T_n$ are computed in the manner described above.

Although the computer logic in the preferred embodiment of this invention utilizes polar coordinate functions, it is not to be considered as limited thereto. For example, since the detectors A and B measure angles and the depth of the included side "$d$" is known, a computer provided with functions according to the law of sines could be used to compute the $r_1 \ldots r_n$ distances to the infrared sources $T_1 \ldots T_n$.

In order to show the elevation of the infrared sources $T_1 \ldots T_n$ and also to correlate the distances and bearings shown on readout 101 with the elevations to the infrared sources, FIGURE 5 shows selsyn 107 attached to the tilt axis of detector A in addition to the selsyn 105. The output from selsyn 105, connected to the vertical axis, is fed through lead 106b to the horizontal plates of cathode ray tube 109. The output of selsyn 107 is a sine wave voltage which is fed through lead 108 to the vertical plates of tube 109. The same positive pulse from differentiator circuit 72, used to open gate 129 momentarily for a particular infrared source, is simultaneously fed by lead 110b to the cathode of tube 109. The cathode is intensity modulated by the pulse and emits electrons producing a spot on the screen indicative of the elevation angle and bearing of the radiation emitting source. For a discussion of elevation and bearing angle presentation on cathode ray tubes, see section 6.6, vol. 1, Radiation Laboratory Series.

It is apparent that the method and system of the present invention, as described, is subject to considerable choice in the pulse counting and computer circuits, methods of computation, computer logic, wavelengths of radiant energy to be detected, and choice of materials, speeds and detector embodiments. Therefore, any such changes or modifications as fall within the scope of the appended claims are intended as part of this invention.

What is claimed is:

1. A system for determining the position of radiant energy sources including a first radiant energy detector rotating at constant speed, a second radiant energy detector rotating in synchronism with said first detector and separated therefrom, means measuring individually the angle at each of said first and second detectors from a source of radiant energy to a common baseline therebetween by counting constant frequency pulses over the time period of rotation of each said first and second detectors required to define said angles, and means utilizing said counted pulses representative of said angles and the distance separating said detectors in computing the distance to said radiant energy source.

2. A system for determining the position of radiant energy sources including a first radiant energy detector rotating at constant speed, a second radiant energy detector rotating in synchronism with said first detector and separated therefrom, a plurality of means measuring the angles at each of said first and second detectors from a plurality of radiant energy sources to a common baseline therebetween by counting the constant frequency pulses over the time period of rotation of said first and second detectors required to define each of said angles, and means utilizing said counted pulses representative of said angles and the distance separating said detectors in computing the distance to each of said radiant energy sources.

3. A system for determining the position of radiant energy sources including a first radiant energy detector rotating at constant speed, a second radiant energy detector rotating in synchronism with said first detector and separated therefrom, a fixed source of radiant energy positioned intermediate said detectors, means measuring the angle at said first detector between a line of radiation from a radiant energy source and a line from said fixed source, means measuring the angle at said second detector between a line of radiation from the radiant energy source and a line from said fixed source, and means wherein said measured angles and the distance between said detectors are utilized in computing the distance to the source emitting said radiant energy.

4. A system for determining the position of radiant energy sources including a first radiant energy detector rotating at constant speed, a second radiant energy detector rotating in synchronism with said first detector and separated therefrom, a fixed source of radiant energy positioned intermediate said detectors, constant frequency pulse counting means measuring the angle at said first detector between a line of radiation from a radiant energy source and a line from said fixed source, constant frequency pulse counting means measuring the angle at said second detector between a line of radiation from the radiant energy source and a line from said fixed source, and means wherein said counted pulses representative of said angles and the distance between said detectors are used in computing the distance to the source emitting said radiant energy.

5. A system for determining the position of radiant energy sources including a first radiant energy detector rotating at constant speed, a second radiant energy detector rotating in synchronism with said first detector and separated therefrom, a fixed source of radiant energy positioned intermediate said detectors, a plurality of constant frequency pulse counting means measuring the angles at said first detector between lines of radiation from a plurality of radiant energy sources and the line from said fixed source, a plurality of constant frequency pulse counting means measuring the angles at said second detector between lines of radiation from said plurality of radiant energy sources and the line from said fixed source, and means wherein the counted pulses representative of said angles and the distance between said detectors are used in computing the distances to said sources emitting said radiant energy.

6. A system for determining the position of radiant energy sources including a first radiant energy detector rotating at constant speed, a second radiant energy detector rotating in synchronism with said first detector and separated therefrom, a fixed source of radiant energy positioned intermediate said detectors, constant frequency pulse counting means measuring the angle at said first detector between a line of radiation from a radiant energy source and a line from said fixed source, constant frequency pulse counting means measuring the angle at said second detector between a line of radiation from the radiant energy source and a line from said fixed source, means at one of said detectors producing an indication of the bearing angle to said radiant energy source and computer means utilizing said bearing angle indication, said counted pulses representative of said angles and the distance between said detectors in computing the distance to the source emitting said radiant energy.

7. A system for determining the position of radiant energy sources including a first radiant energy detector rotating at constant speed, a second radiant energy detector rotating in synchronism with said first detector and separated therefrom, a fixed source of radiant energy positioned intermediate said detectors, constant frequency pulse counting means measuring the angle at said first detector between a line of radiation from a radiant energy source and a line from said fixed source, constant frequency pulse counting means measuring the angle at said second detector between a line of radiation from the radiant energy source and a line from said fixed source, means at one of said detectors producing an indication of the bearing angle to said radiant energy source, computer means utilizing said bearing angle indication, said counted pulses representative of said angles and the distance between said detectors in computing the distance to the source emitting said radiant energy, and readout means receiving said bearing angle indication and said computed distance.

8. A system for determining the position of radiant energy sources including a first radiant energy detector rotating at constant speed, a second radiant energy detector rotating in synchronism with said first detector and separated therefrom, a fixed source of radiant energy positioned intermediate said detectors, a plurality of constant frequency pulse counting means measuring the angles at said first detector between lines of radiation from a plurality of radiant energy sources and the line from said fixed source, a plurality of constant frequency pulse counting means measuring the angles at said second detector between lines of radiation from said plurality of radiant energy sources and the line from said fixed source, means at one of said detectors producing indications of the bearing angle to each of said plurality of radiant energy sources, computer means utilizing said bearing angle indications, said counted pulses representative of said angles, and the distance between said detectors sequentially in computing the distance to each of said radiant energy emitting sources, and readout means receiving said bearing angle indications and said computed distances.

9. A system for determining the position of radiant energy sources including a first radiant energy detector rotating at constant speed, a second radiant energy detector rotating in synchronism with said first detector and separated therefrom, a fixed source of radiant energy positioned intermediate said detectors, a plurality of constant frequency pulse counting means measuring the angles at said first detector between lines of radiation from a plurality of radiant energy sources and the line from said fixed source, a plurality of constant frequency pulse counting means measuring the angles at said second detector between lines of radiation from said plurality of radiant energy sources and the line from said fixed source, means at one of said detectors producing indications of the bearing angle to each of said plurality of radiant energy sources, polar coordinate type computer means utilizing said bearing angle indications, said counted pulses representative of said angles, and the distance between said detectors sequentially in computing the distance to each of said radiant energy emitting sources, and readout means receiving said bearing angle indications and said computed distances.

10. A system for determining the position of radiant energy sources including a first radiant energy detector rotating at constant speed, a second radiant energy detector rotating in synchronism with said first detector and separated therefrom, a fixed source of radiant energy positioned intermediate said detectors, a plurality of constant frequency pulse counting means measuring the angles at said first detector between lines of radiation from a plurality of radiant energy sources and the line from said fixed source, a plurality of constant frequency pulse counting means measuring the angles at said second detector between lines of radiation from said plurality of radiant energy sources and the line from said fixed source, means at one of said detectors producing indications of the bearing angle to said plurality of radiant energy sources, means at said detectors to cyclically tilt said detectors during rotation, means mounted at said one detector for obtaining indications of the elevation angle of said detector, a polar coordinate type computer utilizing said bearing angle indications, said counted pulses representative of said angles and the distance between said detectors in computing the distance to said radiation emitting sources, readout means for receiving said bearing angle indications and said computed distances, and means displaying said bearing angle and elevation angle indications of said radiation emitting sources.

11. A system for determining the position of radiation emitting sources as defined in claim 10 wherein said counted pulses representative of said angles are converted in said polar coordinate type computer to analog form in computing the distances to radiation emitting sources.

12. A system for determining the position of radiation emitting sources as defined in claim 10 wherein said elevation angle and bearing angle indications and said computed distances to radiation emitting sources are presented to said readout means and said bearing angle and elevation angle displaying means in analog form.

References Cited in the file of this patent

UNITED STATES PATENTS

| | | |
|---|---|---|
| 2,070,178 | Pottenger et al. | Feb. 9, 1937 |
| 2,116,717 | Scharlau | May 10, 1938 |
| 2,246,496 | Asbury | June 24, 1941 |
| 2,489,222 | Herbold | Nov. 22, 1949 |
| 2,710,962 | Fritze | June 14, 1955 |
| 2,760,190 | Henrici | Aug. 21, 1956 |
| 2,830,487 | Griffith | Apr. 15, 1958 |